(12) United States Patent
Barel et al.

(10) Patent No.: US 10,296,605 B2
(45) Date of Patent: May 21, 2019

(54) DICTIONARY GENERATION FOR EXAMPLE BASED IMAGE PROCESSING

(71) Applicant: INTEL CORPORATION, Santa Clara, CA (US)

(72) Inventors: Hila Barel, Tel Aviv (IL); Gilad Michael, Tzur Yizhak (IL); Edmond Chalom, Petach Tikvah (IL)

(73) Assignee: Intel Corporation, Santa Clara, CA (US)

( * ) Notice: Subject to any disclaimer, the term of this patent is extended or adjusted under 35 U.S.C. 154(b) by 732 days.

(21) Appl. No.: 14/968,164

(22) Filed: Dec. 14, 2015

(65) Prior Publication Data

US 2017/0169057 A1    Jun. 15, 2017

(51) Int. Cl.
| | |
|---|---|
| *G06K 9/00* | (2006.01) |
| *G06F 17/30* | (2006.01) |
| *G06N 99/00* | (2019.01) |
| *G06T 3/40* | (2006.01) |

(52) U.S. Cl.
CPC ......... *G06F 17/30277* (2013.01); *G06K 9/00* (2013.01); *G06N 99/005* (2013.01); *G06T 3/4015* (2013.01)

(58) Field of Classification Search
CPC ... G06F 17/30277; G06K 9/00; G06T 3/4015; G06N 99/005
See application file for complete search history.

(56) References Cited

U.S. PATENT DOCUMENTS

| | | | | |
|---|---|---|---|---|
| 5,905,812 | A * | 5/1999 | Kim | H04N 11/042 |
| | | | | 375/E7.14 |
| 2004/0218834 | A1* | 11/2004 | Bishop | H04N 19/587 |
| | | | | 382/299 |
| 2009/0208110 | A1* | 8/2009 | Hoppe | G06T 9/00 |
| | | | | 382/190 |
| 2011/0142330 | A1 | 6/2011 | Kyung-Sun et al. | |
| 2013/0170767 | A1 | 7/2013 | Choudhury | |
| 2014/0321738 | A1* | 10/2014 | Shibata | G06N 99/005 |
| | | | | 382/160 |
| 2015/0324953 | A1 | 11/2015 | Marcos et al. | |
| 2016/0092751 | A1* | 3/2016 | Zavesky | G06K 9/6202 |
| | | | | 382/205 |

(Continued)

OTHER PUBLICATIONS

International search Report and Written Opinion for International Patent Application PCT/US2016/059728, dated Feb. 13, 2017.

(Continued)

*Primary Examiner* — John B Strege
(74) *Attorney, Agent, or Firm* — Green, Howard & Mughal LLP

(57) ABSTRACT

Techniques related to generating dictionaries for example based image processing algorithms are discussed. Such techniques may include iteratively performing example based image processing for candidate look up entries of candidate pairs from a training set database using a current dictionary to determine a test result for each of the look up entries of the candidate pairs and selecting one or more of the candidate pairs for entry in a resultant dictionary based on an error between the test result and a predetermined result entry for the candidate pairs.

19 Claims, 8 Drawing Sheets

(56) References Cited

U.S. PATENT DOCUMENTS

2016/0189002 A1* 6/2016 Kawakami .......... G06K 9/6211
　　　　　　　　　　　　　　　　　　　　　　382/218
2016/0198051 A1* 7/2016 Nakamura ......... H04N 1/00241
　　　　　　　　　　　　　　　　　　　　　　358/426.02
2016/0277745 A1* 9/2016 Guillemot ............ H04N 19/176

OTHER PUBLICATIONS

K. Li, B. Gunturk and L. Zhang, "Image Demosaicing: A Systematic Survey", Proc. SPIE, vol. 6822, pp. 68221J 2008 (15 pages).
G. Michael and N. Kiryati, "Example Based Demosaicing", 2014 IEEE International Conference on Image Processing (ICIP), Oct. 27-30, 2014, pp. 1832-1836.
International Preliminary Report on Patentability for International Patent Application No. PCT/US16/59728, dated Jun. 28, 2018.

* cited by examiner

DICTIONARY GENERATION FOR EXAMPLE BASED IMAGE PROCESSING

BACKGROUND

Demosaicing techniques may reconstruct a full color image from incomplete color samples output from an image sensor overlaid with a color filter array (CFA). For example, demosaicing may be an important operation in a camera or imaging pipeline. Current techniques for performing demosaicing include spatial interpolation, frequency domain approaches, and example based demosaicing.

For example, spatial interpolation techniques may leverage the fact that the color channels are highly correlated to reconstruct the full color image. Frequency domain approaches such as frequency domain interpolation may use the known CFA sampling pattern to separate luminance and chrominance terms by applying appropriate filters. Example based demosaicing may include learning the relationship between the CFA pattern and surrounding pixels. For example, in example based demosaicing, a dictionary including pairs of image patches (each pair including an incomplete color patch in a pattern such as a Bayer pattern and a corresponding full resolution RGB patch or the like) may be provided. Incomplete color patch data from a sensor or the like may be used to reference the dictionary, which may provide a full resolution color patch.

Current techniques may perform well on most natural scenes. However, on high resolution natural images with varying hue and high saturation edges, performance degrades significantly due to erroneous constant-hue assumptions, chroma aliasing, and other limitations. Furthermore, improvement may be constantly sought even in contexts where current techniques may perform well. It is with respect to these and other considerations that the present improvements have been needed. Such improvements may become critical as the desire to attain high quality images becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
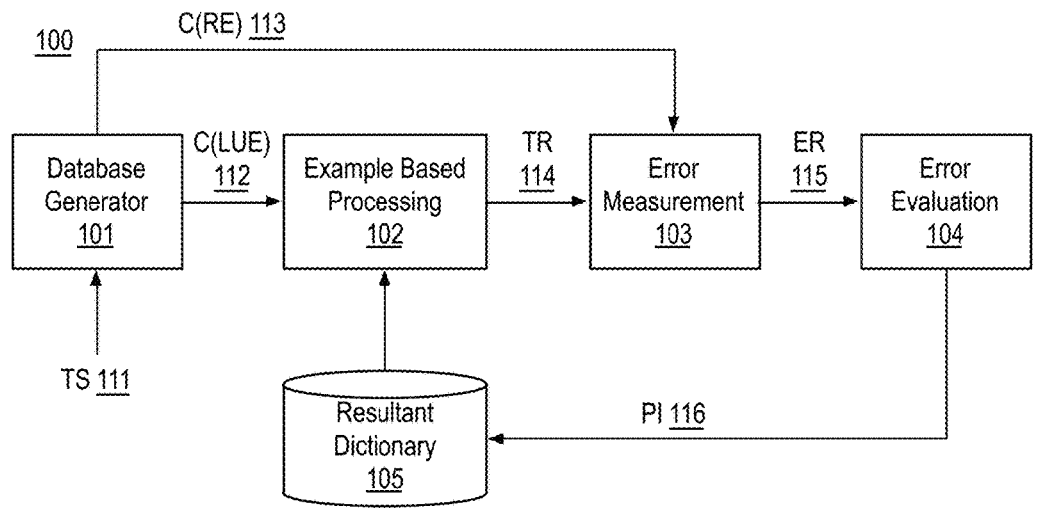
FIG. 1 illustrates an example device for generating a dictionary for example based image processing.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic.

Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to generating a dictionary for example based image processing and, in particular, to iteratively evaluating candidate pairs from a training set database for entry into a resultant dictionary.

As described above, it may be advantageous to provide high quality demosaicing in imaging systems. Furthermore, it may be advantageous for such demosaicing to be fast and efficient. For example, demosaicing may be performed using example based demosaicing such that a patch or the like of samples output from an image sensor overlaid with a color filter array may be provided. The samples may be characterized as a n-dimensional vector and the vector may be used to search a dictionary for one or more nearest neighbors. Full resolution patch(es) associated with the nearest neighbors may be retrieved and processed (e.g., averaged or the like) to determine a final full resolution demosaiced patch associated with the samples. Such processing may be repeated for all patches of an image to demosaic the image into a final full resolution color image such as an RGB image.

In such contexts, the quality of the dictionary of pairs (e.g., pairs of samples and full resolution patches) is an important factor with respect to the quality of the demosaiced image. Furthermore, it may be desirable to select a compact and efficient dictionary of pairs such that the dictionary may be searched quickly and such that implementations of the dictionary are efficient in terms of memory usage and the like.

The techniques discussed herein provide techniques for building a dictionary for demosaicing or other image processing tasks such as super resolution processing or the like. The resultant dictionary may provide better image quality, lower memory requirements, and faster search speeds. In an embodiment, such a compact, efficient dictionary may be generated by starting with an initial dataset of dictionary pairs (e.g., a seed set of pairs) such that each pair includes a predetermined look up entry (e.g., a Bayer patch in the context of demosaicing) and a predetermined result entry (e.g., a demosaiced full RGB patch in the context of demosaicing). The dictionary may be increased in a simulated test environment such that candidate pairs from a training set database may be added based on an error generated in the test environment. In such an example, the predetermined result entry (e.g., Bayer patch) and predetermined result entry (e.g., full RGB output) is known for each candidate pair. At each iteration of the dictionary building process, using the current dictionary database, example based processing may be applied to the candidate pairs (e.g., which may be randomly selected from training set database). The error between the test result (e.g., reconstructed full RGB patch) and the known predetermined result entry (e.g., known reconstructed full RGB patch) may be determined for the candidate pairs. The candidate pairs having an error above a threshold (e.g., indicating the current dictionary is insufficient to perform high quality example based processing for such candidate pairs) may be added to the dictionary for the next iteration. Such iterations may be repeated until the dictionary has reached its desired size, until there are no longer any errors above the threshold, or the like.

In some embodiments, generating a dictionary for example based image processing may include determining multiple candidate pairs from a training set database such that each of the candidate pairs includes a predetermined look up entry and a corresponding predetermined result entry, performing example based processing for each of the look up entries of the candidate pairs using a current dictionary to determine a test result for each of the look up entries of the candidate pairs, generating, for each of the look up entries of the candidate pairs, an error result based on the test result and the predetermined result entry, and selecting one or more of the candidate pairs for inclusion in a resultant dictionary based on the error results.

FIG. 1 illustrates an example device 100 for generating a dictionary for example based image processing, arranged in accordance with at least some implementations of the present disclosure. As shown in FIG. 1, device 100 may include a database generator 101, an example based processing module 102, an error measurement module 103, an error evaluation module 104, and a resultant dictionary 105. Device 100 may be any suitable form factor device such as a computer, a laptop computer, a tablet, a smart phone, a phablet, a digital camera, a display device, a gaming device, a wearable device such as a smart watch, smart glasses, or the like.

As shown, database generator 101 may receive a training set (TS) 111 such as a training set database or the like. For example, training set 111 may include multiple pairs of predetermined look up entries and corresponding predetermined result entries. Training set 111 may include any number of such pairs of entries and training set 111 may be generated using any suitable technique or techniques. For example, training set 111 may include millions of pairs of entries. Training set 111 may be generated by pairing look up entries with known desirable result entries based on a known good data pairings, manual manipulation, or the like. For example, in the context of demosaicing, training set 111 may include predetermined look up entries that are raw image pixel patches (e.g., representative of samples output from an image sensor) and predetermined result entries that are full resolution RGB patches (e.g., representative of a full resolution image patch) such that the full resolution RGB patch for a raw image pixel patch is a known desirable result with respect to the raw image pixel patch. Similarly, in the context of super resolution processing, training set 111 may include predetermined look up entries that are pixel patches at a particular resolution and predetermined result entries that are higher resolution pixel patches such that the higher resolution pixel patch is a known desirable result with respect to the lower resolution pixel patch.

As shown, database generator 101 may determine candidate pairs from training set 111 and database generator 101 may provide look up entries of such candidate pairs as candidate look up entries (C(LUE)) 112 to example based processing module 102 and result entries of such candidate pairs as candidate result entries (R(RE)) 113 to error measurement module 103. Database generator 101 may determine such candidate pairs using any suitable technique or techniques. In an embodiment, database generator 101 may randomly select such candidate pairs from training set 111.

Furthermore, database generator 101 may select a seed set of pairs and provide those selected seed pairs to resultant dictionary 105. Such seed pairs may provide an initial dictionary to begin the generation of resultant dictionary 105, for example. Such seed pairs may be selected using any suitable technique or techniques. In an embodiment, database generator 101 may randomly select such seed pairs from training set 111. Any number of seed pairs may be selected such as about 20 to 50 seed pairs.

As discussed, in the context of demosaicing, candidate pairs (e.g., pairs of predetermined look up entries and predetermined result entries) may include pairs of raw image pixel patches and full resolution patches (e.g., RGB patches or patches represented in another color space). In the context of super resolution processing, candidate pairs may include pixel patches at a particular resolution and higher resolution pixel patches. However, such candidate pairs of predetermined look up entries and predetermined result entries may be any suitable pairs of data structures that may be implemented via example based processing as discussed herein.

As discussed, example based processing module 102 may receive candidate look up entries 112 from database generator 101. Example based processing module 102 may perform example based processing for each of candidate look up entries 112 using the current version of resultant dictionary 105 to generate corresponding test results (TR) 114. For example, at a first iteration, resultant dictionary 105 may include the seed pairs as discussed above and, at subsequent iterations, resultant dictionary 105 may include the seed pairs and candidate pairs added at any previous iterations. Using such techniques, resultant dictionary 105 may be built until a particular stop point is reached. The stop point may be based on a limit to the number of entries allowed for resultant dictionary 105. For example, resultant dictionary 105 may be limited to a fixed size such as K pairs of entries and the iterative processing discussed herein may stop when the K pairs limit has been reached. Such a size of resultant dictionary 105 in the context of limiting the size or in any other context may be thousands of pairs. For example, final resultant dictionary 105 may have thousand of pairs of look up entries and corresponding result entries.

Example based processing module 102 may perform example based processing using any suitable technique or techniques. For example, one or more nearest neighbor entries for each of candidate look up entries 112 may be determined and the one or more corresponding result entries may be provided as the test results. If more than one nearest neighbor entries are used, such corresponding result entries may be averaged or the like to determine the test result corresponding to the candidate look up entry. Although discussed with respect to nearest neighbor searching, any suitable example based processing may be used to generate test results 114.

Figure 5:
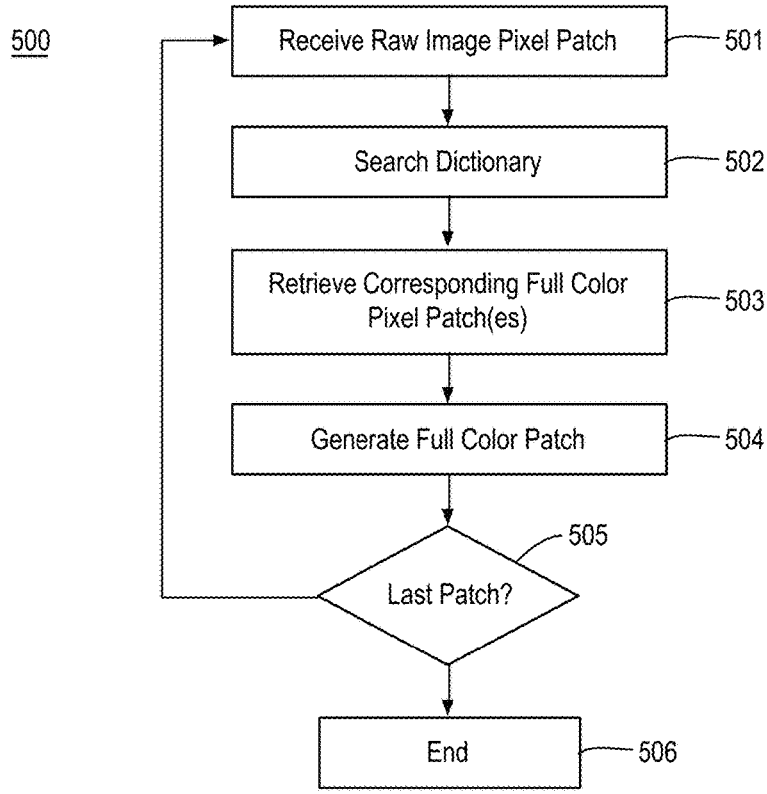
FIG. 5 illustrates an example process for performing example based demosaicing.
Figure 6:
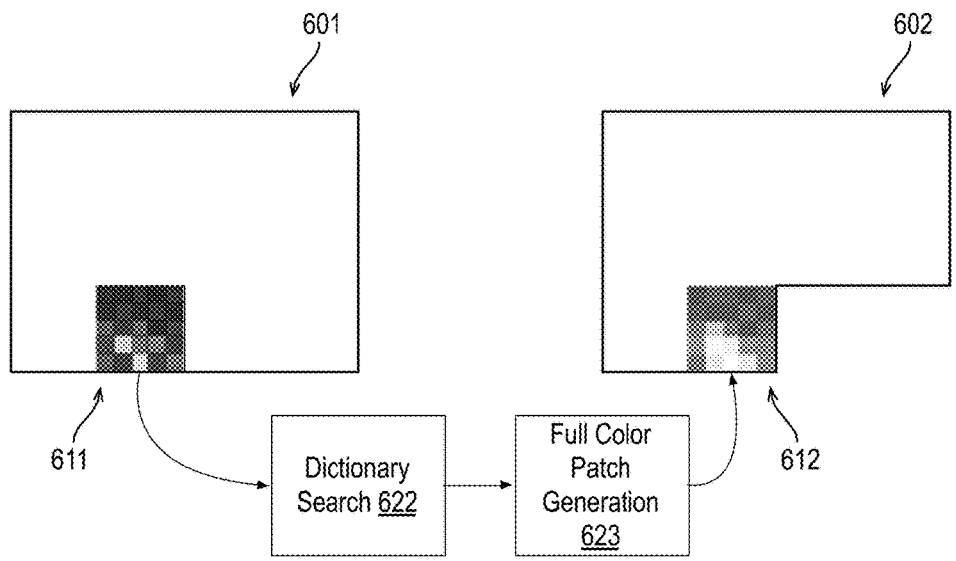
FIG. 6 illustrates an example image sensor image being demosaiced to form an example demosaiced image.

Furthermore, in the context of demosaicing, such example based processing may be characterized as example based demosaicing and such processing may be performed as discussed elsewhere herein and, in particular, with respect to FIGS. 5 and 6. For example, for each of candidate look up entries 112 (such that the look up entry is a raw image pixel patch, vector representation thereof, or the like), one or more nearest neighbor entries from the current resultant dictionary may be found and the corresponding full resolution image patch(es) for those nearest neighbor entries may be used to determine the result for each of candidate look up entries 112.

In the context of super resolution processing, such example based processing may be characterized as example based super resolution and such processing may include, for each of candidate look up entries 112 (such that the look up entry is pixel patch at a particular resolution, vector representation thereof, or the like), one or more nearest neighbor entries from the current resultant dictionary may be found and the corresponding higher resolution pixel patch(es) for those nearest neighbor entries may be used to determine the result for each of candidate look up entries 112.

As discussed, example based processing module 102 may generate test results 114 such that each of candidate look up entries 112 has a corresponding test result in test results 114. As shown, test results 114 may be provided to error measurement module 103, which may generate an error result for each of candidate look up entries 112 to provide error results (ER) 115. Error measurement module 103 may generate error results 115 using any suitable technique or techniques. For example, for each of candidate look up entries 112, error measurement module 103 may compare the corresponding test result from test results 114 and candidate result entry from candidate result entries 113. The error for each of candidate look up entries 112 may be any suitable measurement of error such as L2 error or the like.

As shown, such error results 115 may be provided to error evaluation module 104, which may select one or more (or none) of candidate pairs of candidate look up entries 112/candidate result entries 113 for inclusion in resultant dictionary 105. Such selected candidate pairs are shown as pairs for inclusion (PI) 116, which may be transferred to resultant dictionary 105. Error evaluation module 104 may select pairs for inclusion 116 using any suitable technique or techniques. In an embodiment, error evaluation module 104 may compare each of error results 115 to a threshold such as a predetermined threshold and candidate pairs corresponding to error results greater than the threshold may be included in pairs for inclusion 116. In another embodiment, a particular number of candidate pairs may be selected based on having the largest error results and such selected candidate pairs may be included in pairs for inclusion 116. The candidate pairs not selected may be discarded.

Such processing may repeat, as discussed, until resultant dictionary has reached a maximum number of pairs of entries, until no pairs of entries having a threshold amount of error can be found, or the like. Such iterative processing may generate a high quality resultant dictionary 105 for example based image processing. For example, iterating over the example based processing (e.g., example based demosaicing, example based super resolution processing, or the like) and selecting pairs with large errors may minimize errors during application of resultant dictionary 105. For example, such techniques may determine whether to add pairs to resultant dictionary 105 based on encoding/decoding errors (e.g., errors generated during the example based processing performed by example based processing module 102), which may advantageously select pairs that provide a broad and accurate representation of training set 111. For example, the techniques discussed herein may select candidates that yield large example based processing errors during training to provide to the current resultant dictionary 105 a better representation for that candidate look up entry. Such techniques may efficiently select entries for resultant dictionary 105.

Figure 2:
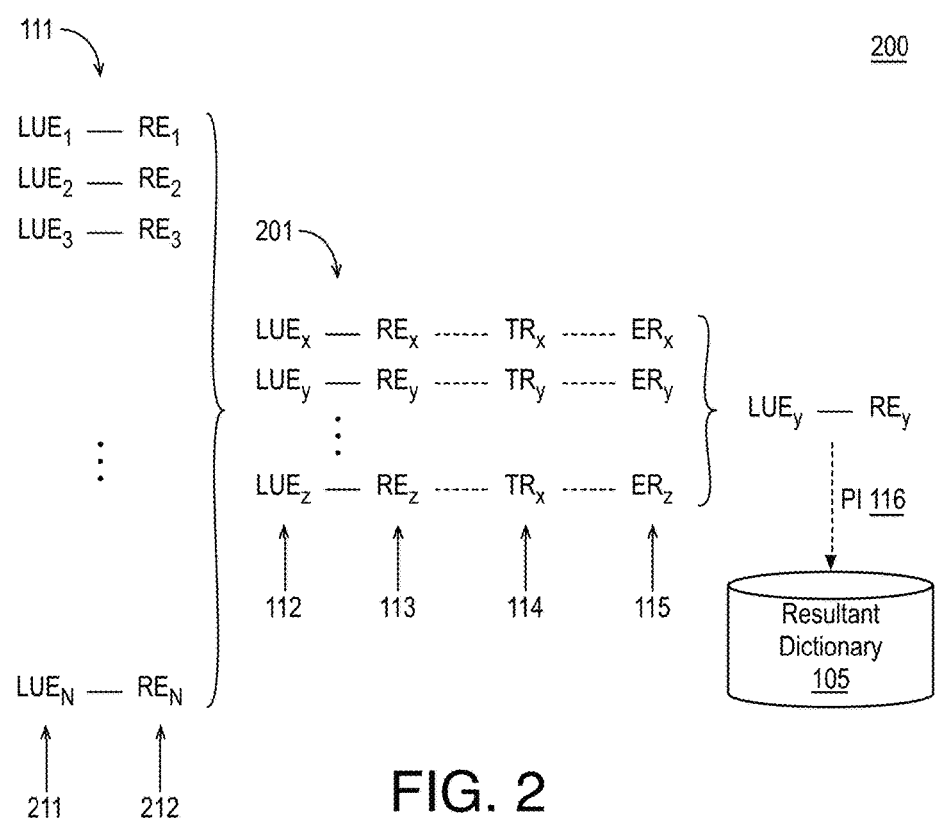
FIG. 2 illustrates an example data structure for generating a dictionary for example based image processing.

FIG. 2 illustrates an example data structure 200 for generating a dictionary for example based image processing, arranged in accordance with at least some implementations of the present disclosure. As shown in FIG. 2, training set 111 may include pairs of predetermined look up entries (LUE) 211 and predetermined result entries (RE) 212. Training set 111 may include pairs having any features or characteristics as discussed herein. Furthermore, as shown, training set 111 may include N entries such that N is a large number such as a million or more. As discussed with respect to database generator 101, candidate pairs 201 from training set 111 may be selected for processing. As shown in FIG. 2, candidate pairs 201 may include pairs of candidate look up entries 112 and candidate result entries 113 such that candidate look up entries 112 and candidate result entries 113 are predetermined and provide a desirable pairing (e.g., candidate result entries 113 provide desirable results with respect to candidate look up entries 112) as discussed herein.

As shown, candidate pairs 201 may include any number of pairs such as 20-50 pairs or the like from training set 111. In the example of FIG. 2, particular pairs are labeled as pair-x, pair-y, and pair-z. Furthermore, although not shown in FIG. 2, as discussed, seed pairs from training set 111 may be selected and provided in resultant dictionary 105. As shown, for each of candidate pairs 201, a test result of test results 114 may be determined. For example, test results 114 may be determined by example based processing module 102 using a current resultant dictionary 105 as discussed herein. As shown, a test result $TR_x$ may be determined for pair-x including $LUE_x$ and $RE_x$, a test result $TR_y$ may be determined for pair-y including $LUE_y$ and $RE_y$, a test result $TR_z$ may be determined for pair-z including $LUE_z$ and $RE_z$, and so on.

Furthermore, as shown, for each of candidate pairs 201, an error result of error results 115 may be determined. For example, error results 115 may be determined by error measurement module 103 based on candidate result entries 113 and test results 114 as discussed herein. As shown, an error result $ER_x$ may be determined for pair-x including $LUE_x$ and $RE_x$, an error result $ER_y$ may be determined for pair-y including $LUE_y$ and $RE_y$, an error result $ER_z$ may be determined for pair-z including $LUE_z$ and $RE_z$, and so on. As discussed, based on error results 115, one or more (or none) of candidate pairs 201 may be selected for inclusion in resultant dictionary 105 based on error results 115. For example, error results of error results 115 greater than a threshold, a number of error results of error results 115 having the largest errors, or the like may be selected. In the example of FIG. 2, a single candidate pair of candidate pairs 201 (e.g., pair-y including $LUE_y$ and $RE_y$) is selected for inclusion in resultant dictionary 105 as part of pairs for inclusion 116 for illustrative purposes.

Figure 3:
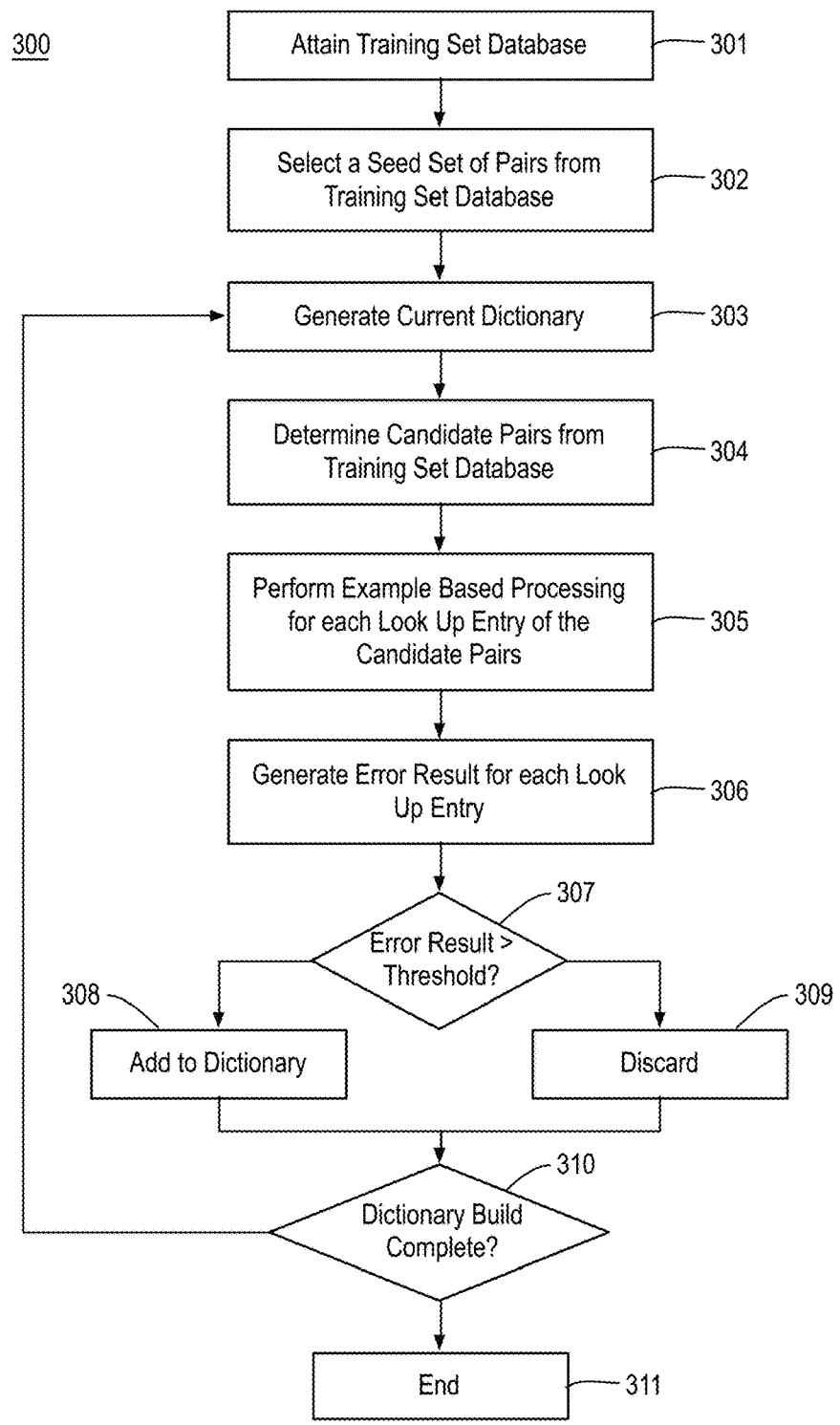
FIG. 3 illustrates an example process for generating a dictionary for example based image processing.

FIG. 3 illustrates an example process 300 for generating a dictionary for example based image processing, arranged in accordance with at least some implementations of the present disclosure. Process 300 may include one or more operations 301-311 as illustrated in FIG. 3. Process 300 or portions thereof may be performed by a device (e.g., device 100 or any other device or system discussed herein) to generate a dictionary for example based image processing. Process 300 or portions thereof may be repeated for any number such dictionaries.

As shown, process 300 may begin at operation 301, where a training set database may be attained. The training set may be attained or generated using any suitable technique or techniques. As discussed, the training set may include many candidate pairs such that each candidate pair includes a predetermined look up entry and a predetermined result entry. For example based demosaicing, the training set may include predetermined look up entries that are raw image pixel patches and predetermined result entries that are full resolution color patches such as RGB patches such that the full resolution RGB patch for a raw image pixel patch is a known desirable result with respect to the raw image pixel patch. Similarly, in the context of super resolution processing, the training set may include predetermined look up entries that are pixel patches at a particular resolution and predetermined result entries that are higher resolution pixel patches such that the higher resolution pixel patch is a known desirable result with respect to the lower resolution pixel patch. With reference to FIG. 1, the training set database determined at operation 301 may be training set 111.

Processing may continue at operation 302, where a seed set of pairs may be selected from the training database. The seed set of pairs may be selected using any suitable technique or techniques such as random selection. In an embodiment, the seed set of pairs may be selected manually such that they broadly cover the available results in the training set. With reference to FIG. 1, database generator 101 may select the seed set of pairs from training set 111 for inclusion resultant dictionary 105.

Processing may continue at operation 303, where a current dictionary may be generated. For example, at a first iteration of process 300, the current dictionary may be generated by including the seed set of pairs selected at operation 302 in the current dictionary. At subsequent iterations of process 300, the current dictionary may be generated by adding those candidate pairs selected at decision operation 307 or the like to the dictionary of the previous iteration. With reference to FIG. 1, resultant dictionary 105 may be generated or maintained at each iteration.

Processing may continue at operation 304, where candidate pairs from the training set database attained at operation 301 may be selected for processing. The candidate pairs may be selected using any suitable technique or techniques. In an embodiment, the candidate pairs are selected randomly from the training set database. In an embodiment, candidate pairs from the current dictionary and those that were discarded at previous iterations may be removed from the candidate pairs that ma be selected at operation 304. Any number of candidate pairs (even a single candidate pair) may be processed. In some examples, about 20-50 candidate pairs may be selected for processing. With reference to FIG. 1, database generator 101 may select the candidate pairs (e.g., including candidate look up entries 112 and corresponding candidate result entries 113) from training set 111

Processing may continue at operation 305, where example based processing (e.g., demosaicing or super resolution processing) may be performed for each look up entry of the candidate pairs based on the current dictionary generated at operation 303 to determine a test result for each look up entry. Such example based processing may be performed using any suitable technique or techniques. For example, such example based processing may be performed as it will be performed during the implementation of the current/resultant dictionary. Such identical or slightly modified (as needed) processing may provide the most accurate resultant dictionary for implementation. With reference to FIG. 1, example based processing module 102 may perform example based processing to generate test results 114 corresponding to candidate look up entries 112.

Processing may continue at operation 306, where an error result may be generated for each look up entry of the candidate pairs based on the test result for the look up entry and the predetermined result entry corresponding to the look up entry. The error results generated at operation 306 may be generated using any suitable technique or techniques. In an embodiment, the error results include an L2 error determined based on the test result and the predetermined result entry. With reference to FIG. 1, error measurement module 103 may generate error results 115 corresponding to candidate look up entries 112.

Processing may continue at decision operation 307, where a determination may be made as to which, if any, of the candidate pairs selected at operation 304 are to be added to the dictionary. Such a determination may be made using any suitable technique or techniques. In an embodiment, the error result for each look up entry may be compared to a threshold such as a predetermined threshold. If the error result is greater than (or equal to or greater than) the threshold, the look up entry and result entry corresponding to the error result may be added to the dictionary at operation 308 and, if not, the look up entry/result entry pair may be discarded at operation 309. In another embodiment, a particular number of look up entry/result entry pairs may be added at each iteration such that the particular number of look up entry/result entry pairs having the largest error values corresponding thereto may be added to the dictionary at operation 308 and the others may be discarded.

Processing may continue from operation 308 and/or operation 309 at decision operation 310, where a determination may be made as to whether the dictionary build is complete. The determination as to whether the dictionary build is complete may be made using any suitable technique or techniques. In an embodiment, the determination may be made by comparing the number of entries of the dictionary to a maximum number of entries such that processing continues until the maximum number of dictionary entries is met. In another embodiment, the determination may be made by comparing the current iteration to a maximum number of iterations such that processing continues until a maximum number of iterations is met. In yet another embodiment, processing may continue until no error result generated at operation 306 is greater than a threshold or until no error result generated at operation 306 is greater than a threshold after a particular number of iterations has been performed. Such a threshold may be the same threshold implemented at decision operation 307 or a different threshold such as a higher threshold.

As shown, if the dictionary build is not complete, processing may continue at operation 303 as discussed. If the dictionary build is complete, processing may end at ending operation 311.

As discussed, in some examples, resultant dictionary 105 may provide a dictionary of pairs for example based demosaicing. In other examples, resultant dictionary 105 may provide a dictionary of pairs for example based super resolution processing. Techniques for performing such example based demosaicing and/or example based super resolution processing are discussed with respect to FIGS. 4, 5, and 6. Without loss of generality, such techniques are discussed with reference to example based demosaicing.

Figure 4:
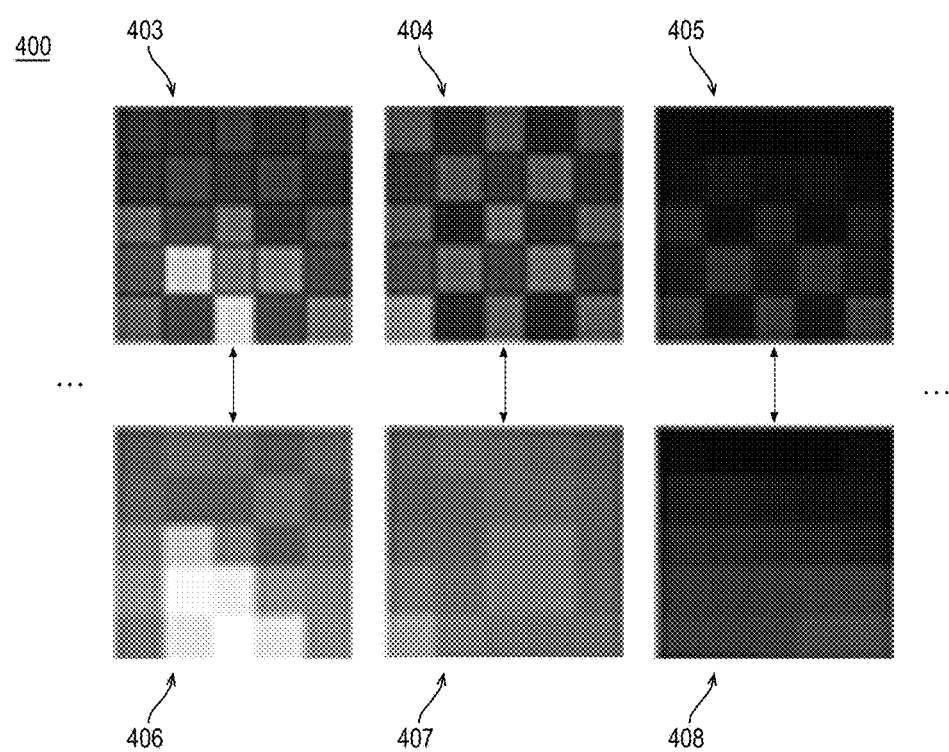
FIG. 4 illustrates an example dictionary of example raw patches and corresponding example full color patches for example based demosaicing.

FIG. 4 illustrates an example dictionary 400 of example raw patches 403-405 and corresponding example full color patches 406-408 for example based demosaicing, arranged in accordance with at least some implementations of the present disclosure. For example, pairs of raw patches 403-405 and corresponding full color patches 406-408 may be selected for inclusion in dictionary 400 as discussed herein. For example, dictionary 400 may be an example of resultant dictionary 105 in the context of example based demosaicing. Dictionary 400 may include any number of raw patches 403-405 such as a thousand or thousands of raw patches 403-405. In the process of example based demosaicing, raw patches 403-405 within dictionary 400 may each be represented by a multidimensional data point (e.g., a 25-dimensional data point with each point associated with a pixel of raw patches 403-405) such that dictionary 400 may be represented by a database of multidimensional data point entries. During demosaicing, such a database may be searched for nearest neighbors or the like.

As also shown in FIG. 4, each of raw patches 403-405 may have an associated color patch from associated full color patches 406-408. For example, raw patch 403 may be associated with full color patch 406, raw patch 404 may be associated with full color patch 407, raw patch 405 may be associated with full color patch 408, and so on. For example, raw patch 403 may be translate (e.g., demosaic) to full color patch 406, raw patch 404 may be translate (e.g., demosaic) to full color patch 407, raw patch 405 may be translate (e.g., demosaic) to full color patch 408, and so on. In the examples discussed herein, multiple best match patches (e.g., based on a patch from an image sensor) may be determined, their associated color patches fetched, and the color patches may be combined (e.g., by averaging or the like) to provide a color patch for the patch from the image sensor.

FIG. 5 illustrates an example process 500 for performing example based demosaicing, arranged in accordance with at least some implementations of the present disclosure. Process 500 may include one or more operations 501-506 as illustrated in FIG. 5. Process 500 or portions thereof may be performed by a device to perform example based demosaicing for image data from an image sensor or image preprocessor. Process 500 or portions thereof may be repeated for any number such dictionaries.

As shown, process 500 may begin at operation 501, where a raw image pixel patch may be received. The raw image pixel patch may include any suitable data associated with a raw (non-demosaiced) patch such as values for each pixel of the raw image pixel patch or the like.

Processing may continue at operation 502, where a dictionary such as a resultant dictionary generated as discussed herein may be searched to find one or more best matches for the received raw pixel patch. For example, the look up entries of the dictionary in such contexts may include raw pixel patches and best matches of the look up entries of the dictionary may be determined at operation 502. Such searching may be performed using any suitable technique or techniques such as nearest neighbor search techniques.

Processing may continue at operation 503, where corresponding full color pixel patch(es) corresponding to the one or more best matches may be retrieved. For example, with reference to FIG. 4, if raw patch 404 is the best match or one of the best matches with respect to the raw pixel patch received at operation 501, corresponding full color patch 407 may be retrieved at operation 503. In an embodiment, multiple best matches may be retrieved such that, at operation 504, they may be averaged or the like to generate a final full color patch.

Processing may continue at operation 504, where a final full color patch may be generated. The final full color patch may be generated using any suitable technique or techniques. As discussed, in an embodiment, multiple best match full color patches may be averaged (e.g., via weighted averaging based on proximity) to generate the final full color patch.

Processing may continue at decision operation 505, where a determination may be made as to whether the current patch being processed is the last patch in an image or otherwise the last patch to be processed. If not, processing may continue at operation 501 for a subsequent patch. If so, processing may end at ending operation 506.

FIG. 6 illustrates an example image sensor image 601 being demosaiced to form an example demosaiced image 602, arranged in accordance with at least some implementations of the present disclosure. As shown in FIG. 6, a raw patch 611 (e.g., a Bayer patch or the like) of image sensor image 601 may be received. For example, image sensor image 601 may be an image pulled from an image sensor and may be represented by any suitable image data. Raw patch 611 may be any suitable size such as 5×5 pixels as illustrated an optional input query for searching a dictionary may be generated such as a 25-dimensional point representative of raw patch 611 (e.g., with a dimension for each pixel of raw patch 611). Also as shown, dictionary search module 622 may search a dictionary as discussed herein based on raw patch 611 to provide one or more best look up entries in the dictionary with respect to raw patch 611. Furthermore, dictionary search module 622 may retrieve the full color patches (e.g., result entries) corresponding to the one or more best look up entries and such full color patches may be provided to full color patch generation module 623. Full color patch generation module 623 the color patches may be combine the full color patches as discussed with respect to operation 504 (e.g., by averaging) to generate a full color patch 612 (e.g., full RGB patch) of demosaiced image 602.

Such processing may be repeated for any number of patches of image sensor image 601 to generate demosaiced image 602. Demosaiced image 602 may be provided for subsequent processing via an image processor, for display to a user, to memory, or the like.

As discussed with respect to FIGS. 4-6, resultant dictionary 105 or the like may provide a dictionary of pairs for example based demosaicing. In other examples, resultant dictionary 105 or the like may provide a dictionary of pairs for example based super resolution processing. Such example based super resolution processing may be performed in analogy to the discussed example based demosaicing such that the raw patches (e.g., look up entries of the dictionary and search look up entry for searching the dictionary) may be replaced with image pixel patches at a particular resolution and the full resolution color patches may be replaced with an image pixel patch at a higher resolution.

Figure 7:
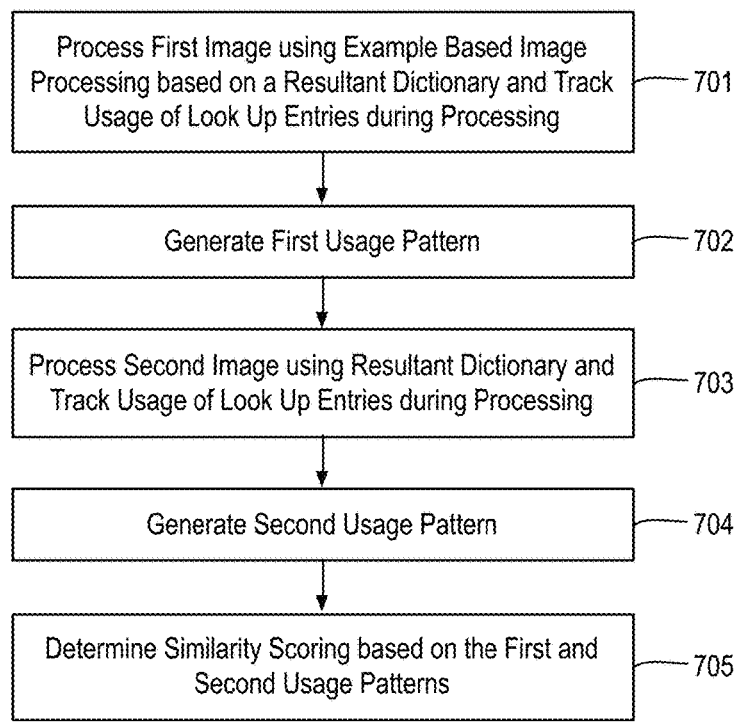
FIG. 7 illustrates an example process for determining a similarity scoring between two images.

FIG. 7 illustrates an example process 700 for determining a similarity scoring between two images, arranged in accordance with at least some implementations of the present disclosure. Process 700 may include one or more operations 701-705 as illustrated in FIG. 7. Process 700 or portions thereof may be performed by a device to determine a similarity scoring between two images based example based image processing using a resultant dictionary. Process 700 or portions thereof may be repeated for any number pairs of images.

As shown, process 700 may begin at operation 701, where a first image may be processed using example based image processing based on a resultant dictionary and usage of look up entries may be tracked during processing. The first image may be processed using any suitable example based image processing. For example, the processing may be example based demosaicing, example based super resolution processing, or example based processing using any suitable image processing. During processing, a usage rate for each entry of the resultant dictionary may be tracked. For example, if an input image patch is demosaiced using one or more look up entries, such look up entries may be incremented. Such processing and tracking may be continued for the entire first image such that each entry of the resultant dictionary has a value associated therewith. For example, such tracking may provide a count (or histogram) of the dictionary entries used for processing. In such a context the entries (e.g., indices) of the resultant dictionary may be used as features that represent the first image.

Processing may continue at operation 702, where a first usage pattern may be generated for the first image based on the usages tracked at operation 701. The first usage pattern may be generated using any suitable technique or techniques. In an embodiment, the first usage pattern may be a histogram or normalized histogram of the usages for each of the dictionary entries.

Processing may continue at operation 703, where a second image may be processed using example based image processing based on the resultant dictionary and usage of look up entries may be tracked during processing. For example, the second image may be processed in the same or similar manner as discussed with respect to the processing of the first image at operation 701. As discussed with respect to the first image, during processing, a usage rate for each entry of the resultant dictionary may be tracked during the processing of the second image. For example, if an input image patch is demosaiced using one or more look up entries, such look up entries may be incremented. Such processing and tracking may be continued for the entire second image such that each entry of the resultant dictionary has a value associated therewith. For example, such tracking may provide a count (or histogram) of the dictionary entries used for processing and the entries (e.g., indices) of the resultant dictionary may be used as features that represent the second image.

Processing may continue at operation 704, where a second usage pattern may be generated for the second image based on the usages tracked at operation 703. For example, the second usage pattern may be in the same or similar manner as used generate the first usage pattern at operation 702. For example, the second usage pattern may be a histogram or normalized histogram of the usages for each of the dictionary entries.

Processing may continue at operation 705, where a similarity scoring may be determined based on the first and second usage patterns generated at operations 702 and 704, respectively. The similarity scoring may be determined using any suitable technique or techniques. In an embodiment, the similarity scoring may be a metric that compares the simulate of histograms or normalized histograms of the first and second images. For example, if the dictionary size of the resultant dictionary applied in process 700 has 5,000 entries, a metric comparing two histograms of 5,000 bins may be determined to provide the similarity of the first and second images. In some embodiments, the scoring may be combined with a hierarchical cluster technique such as a scalable vocabulary tree (SVT) or the like that represents the similarity of the first and second images entries within the resultant dictionary. Such techniques may provide a more refined similarity metric for the first and second images.

Furthermore, the techniques discussed with respect to process 700 may be used to perform an image similarity search. For example, such techniques may be repeated for a first image with respect to any number of images to generate multiple similarity scores and similar images may be established based on one or more of the multiple similarity scores being less than a threshold or the like. For example, such similar images may be flagged for presentment to a user, associated in a database, or the like.

The techniques discussed herein may provide high quality example based processing results such as better image quality in example based demosaicing, less memory/storage usage, and faster search speed. As discussed, such example based processing may include demosaicing, super resolution processing, image similarity processing, or the like. For example, with respect to demosaicing, results using example based demosaicing (EBD) using a dictionary generated using the techniques discussed herein may provide improved performance with respect to edge enhanced demosaicing (EED) techniques. Furthermore, such EBD using a dictionary generated using the techniques discussed herein may provide improved performance with respect to dictionaries generated using K-means clustering techniques. As compared to EED techniques, EBD using a dictionary generated using the techniques discussed herein provided subjectively improved results in terms of enhanced resolution, sharper edges, better retained texture, and reduced aliasing. As compared to EBD using a dictionary generated using K-means clustering, EBD using a dictionary generated using the techniques discussed herein (with the same size dictionary used for both) provided improved multi-scale structural similarity (MS-SSIM) and peak signal to noise ratio (PSNR) scores. For example, over about 1,200 images, the average PSNR score improved from about 30.50 dB to about 31.32 dB and the MS-SSIM score improved from about 0.9878 to about 0.9902. As will be appreciated, such small changes in MS-SSIM score provide large improvements in image quality. Furthermore, EBD using a dictionary generated using the techniques discussed herein provided improved subjective results with respect to EBD using a dictionary generated using K-means clustering such as improved resolution, sharper image features, and the like.

Figure 8:
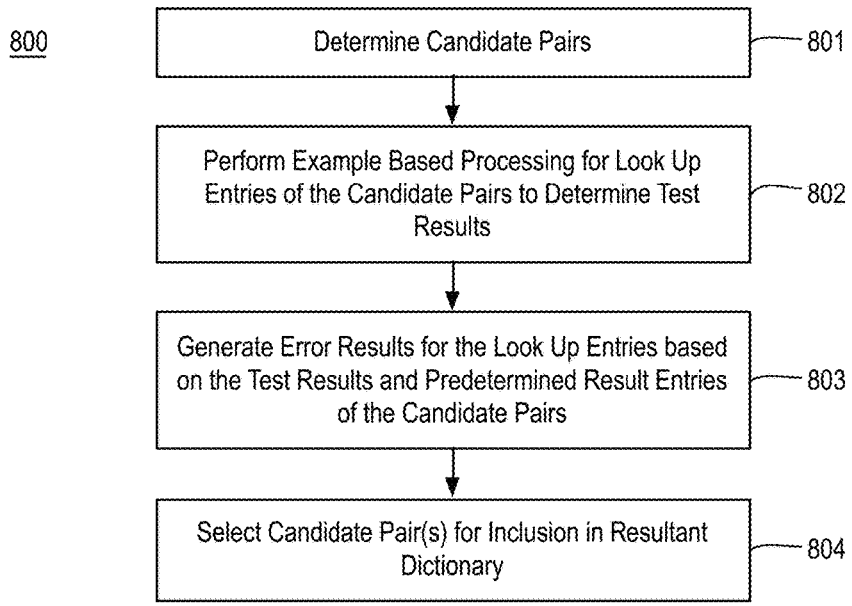
FIG. 8 is a flow diagram illustrating an example process for generating a dictionary for example based image processing.

FIG. 8 is a flow diagram illustrating an example process 800 for generating a dictionary for example based image processing, arranged in accordance with at least some implementations of the present disclosure. Process 800 may include one or more operations 801-804 as illustrated in FIG. 8. Process 800 may form at least part of a dictionary generation technique. By way of non-limiting example, process 800 may form at least part of a dictionary generation technique performed by device 100 as discussed herein. Furthermore, process 800 will be described herein with reference to system 900 of FIG. 9.

Figure 9:
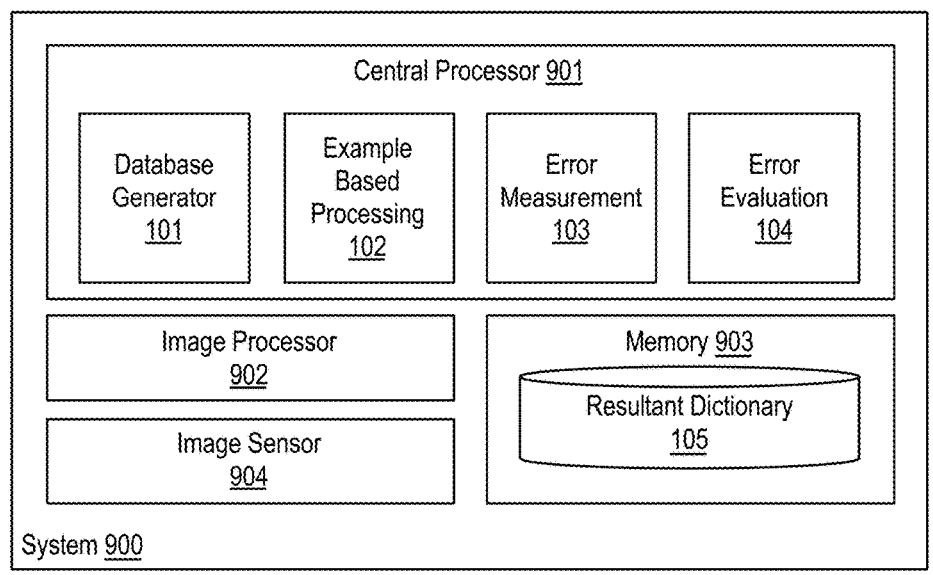
FIG. 9 is an illustrative diagram of an example system 900 for generating a dictionary for example based image processing, for performing example based image processing, and/or performing image similarity scoring.

FIG. 9 is an illustrative diagram of an example system 900 for generating a dictionary for example based image processing, for performing example based image processing, and/or performing image similarity scoring, arranged in accordance with at least some implementations of the present disclosure. As shown in FIG. 9, system 900 may include a central processor 901, an image processor 902, a memory 903, and image sensor 904. Also as shown, central processor 901 may include or implement database generator 101, example based processing module 102, error measurement module 103, and error evaluation module 104. Image processor 902 may perform example based image processing such as example based demosaicing, example based super resolution processing, or the like as discussed with respect to process 700. Furthermore, memory 903 may include or implement resultant dictionary 105. Such components or modules may be implemented to perform operations as discussed herein. In the example of system 900, memory 903 may include resultant dictionary 105. Memory 903 may also store candidate pairs, look up entries, result entries, test results, error results, thresholds, or any other data discussed herein.

Image processor 902 may include any number and type of graphics or image processing units that may provide operations as discussed herein. In some examples, image processor 902 may be an image signal processor. Such operations may be implemented via software or hardware or a combination thereof. For example, image processor 902 may include circuitry dedicated to manipulate image data obtained from memory 903. Central processor 901 may include any number and type of processing units or modules that may provide control and other high level functions for system 900 and/or provide any operations as discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 903 may be implemented by cache memory.

In an embodiment, one or more or portions of database generator 101, example based processing module 102, error measurement module 103, and error evaluation module 104 may be implemented via an execution unit (EU). The EU may include, for example, programmable logic or circuitry such as a logic core or cores that may provide a wide array of programmable logic functions. In an embodiment, one or more or portions of database generator 101, example based processing module 102, error measurement module 103, and error evaluation module 104 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of database generator 101, example based processing module 102, error measurement module 103, and error evaluation module 104 may be implemented via an application specific integrated circuit (ASIC). The ASIC may include an integrated circuitry customized to perform the operations discussed herein.

Returning to discussion of FIG. 8, process 800 may begin at operation 801, where multiple candidate pairs may be determined from a training set database such that each of the candidate pairs includes a predetermined look up entry and a corresponding predetermined result entry. For example, database generator 101 as implemented via central processor 901 may determine the multiple candidate pairs from the training set database. In an embodiment, the multiple candidate pairs may be determined by randomly selecting the multiple candidate pairs from the training set database. In some embodiments, prior to a first iteration of determining multiple candidate pairs, a seed set of pairs may be selected from the training set and provided in the dictionary. For example, database generator 101 as implemented via central processor 901 may determine the seed set of pairs. As discussed, in the context of example based demosaicing, the candidate pairs may include pairs of raw image pixel patches and full color pixel patches. In the context of example based super resolution processing, the candidate pairs may include image pixel patches at a first resolution and image pixel patches at a resolution higher than the first resolution.

Processing may continue at operation 802, where example based processing may be performed for each of the look up entries of the candidate pairs using a current dictionary to determine a test result for each of the look up entries of the candidate pairs. For example, example based processing module 102 as implemented via central processor 901 may perform the example based processing for each of the look up entries of the candidate pairs using a current dictionary to determine a test result for each of the look up entries of the candidate pairs. For example, the current dictionary may be the current dictionary for a current iteration of processing. The example based processing may be performed using any suitable technique or techniques. Such example based processing may include example based demosaicing, example based super resolution processing, or any suitable example based image processing or the like.

Processing may continue at operation 803, where, for each of the look up entries of the candidate pairs, an error result may be generated based on the test result and the predetermined result entry. For example, error measurement module 103 as implemented via central processor 901 may generate an error result for each of the look up entries of the candidate pairs based on the test result and the predetermined result entry. The error results may be generated using any suitable technique or techniques and may include any suitable error measure such as L2 error or the like.

Processing may continue at operation 804, where one or more or none of the candidate pairs may be selected for inclusion in a resultant dictionary based on the error results. For example, the resultant dictionary may be the current dictionary for a subsequent iteration of processing and/or a final dictionary when processing has completed. For example, error evaluation module 104 as implemented via central processor 901 may select candidate pairs, if any, for in the resultant dictionary based on the error results. In an embodiment, selecting the candidate pairs, if any, for inclusion in the resultant dictionary may include comparing the error result to a predetermined threshold. For example, if an error result is greater than the threshold, the corresponding candidate pair may be selected for inclusion in the resultant dictionary.

Such processing may be iterated any number of times to generate a final resultant dictionary. In an embodiment, processing may include iteratively determining candidate pairs, performing example based processing, generating error results, and selecting one or more pairs from the candidate pairs for inclusion in the resultant dictionary until the resultant dictionary has reached a maximum number of entries. In another embodiment, processing may include iteratively determining candidate pairs, performing example based processing, generating error results, and selecting one or more pairs from the candidate pairs for inclusion in the resultant dictionary until no error result in the error results is greater than a threshold for a predetermined number of iterations. In yet another embodiment, processing may include iteratively determining candidate pairs, performing example based processing based on a current dictionary, generating error results, and selecting one or more pairs from the candidate pairs for inclusion in the resultant dictionary such that the current dictionary at each iteration includes the candidate pairs for inclusion from previous iterations.

Furthermore, in some examples, such processing or separate processing may provide similarity scoring between images and/or similarity searching for images. In an embodiment, processing may include processing a first image based on the resultant dictionary and tracking a usage rate for each entry of the resultant dictionary during the demosaicing of the first image to generate a first usage pattern, processing a second image based on the resultant dictionary and tracking a second usage rate for each entry of the resultant dictionary during the demosaicing of the second image to generate a second usage pattern, and determining a similarity scoring of the first image and the second image based on the first and second usage patterns. In an embodiment, such similarity scoring may be repeated for the first image with respect to multiple other images and the similarity scores may be compared to a threshold or ranked or the like to determine one or more images that are similar to the first image. Such similar images may be flagged for presentation to a user, associated with the first image and/or one another in a database, or the like.

Also, such processing or separate processing may include performing example based image processing. For example, example based image processing may utilize the resultant dictionary. Such example based image processing may include receiving an input look up entry (e.g., an input query), searching the resultant dictionary based on the input look up entry to determine one or more nearest look up entries in the resultant dictionary, retrieving result entries corresponding to the nearest look up entries from the resultant dictionary, and generating a final result (e.g., via averaging) based on the result entries. For example, in the context of example based demosaicing, the input look up entries and look up entries in the dictionary may be raw image pixel patches (e.g., Bayer patches) and the result entries from the dictionary may be full color patches (e.g., full resolution RGB patches). In the context of example based super resolution processing, the input look up entries and look up entries in the dictionary may be image pixel patches at a first resolution and the result entries from the dictionary may be image pixel patches at a higher resolution than the first resolution.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a multi-function device or a computing system such as, for example, a laptop computer, a tablet, or a smart phone. Those skilled in the art may recognize that systems described herein may include additional components that have not been depicted in the corresponding figures. For example, the systems discussed herein may include additional components such as image pre-processing circuitry, memory controllers, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any operation discussed herein or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
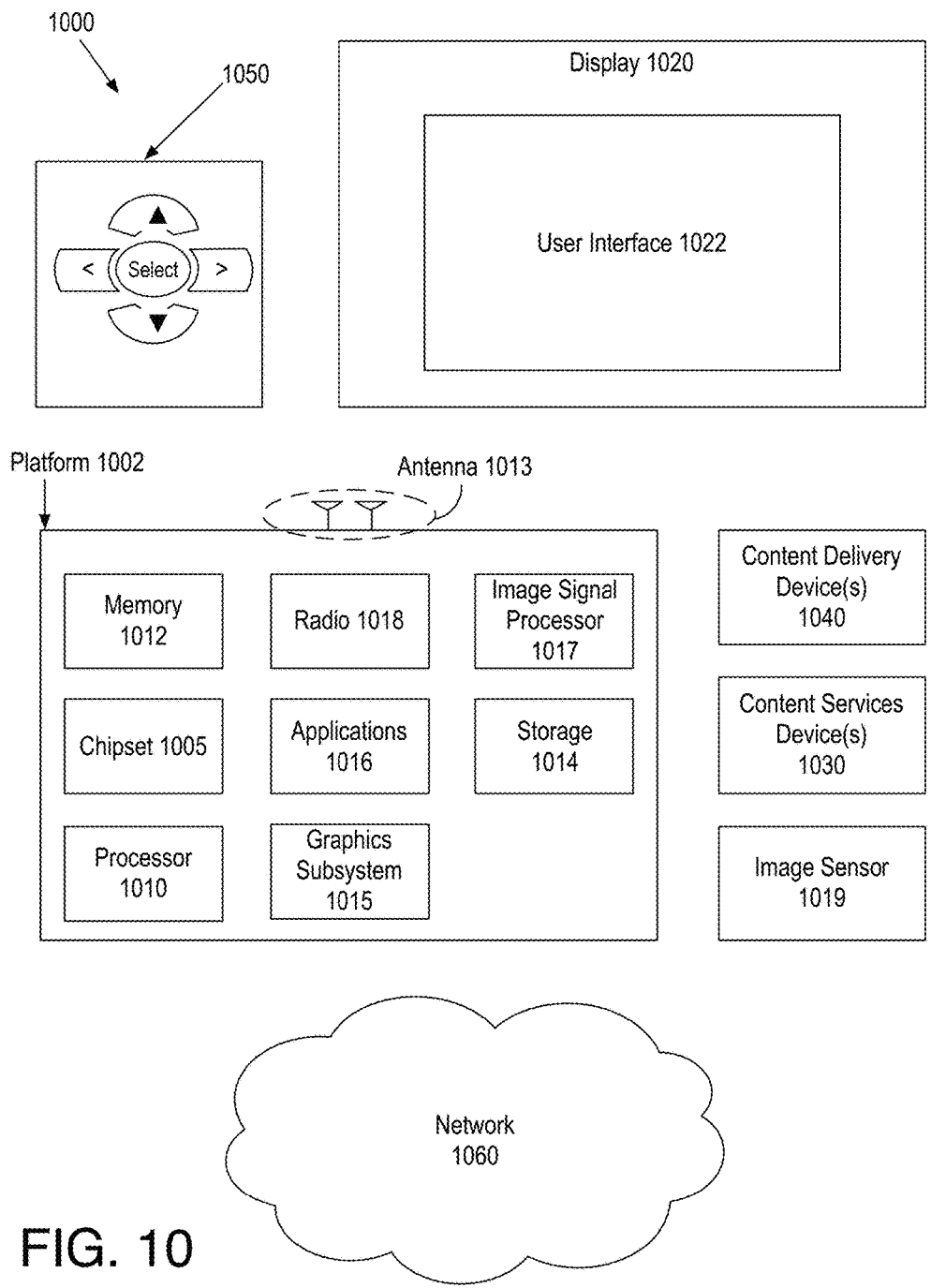
FIG. 10 is an illustrative diagram of an example system.

FIG. 10 is an illustrative diagram of an example system 1000, arranged in accordance with at least some implementations of the present disclosure. In various implementations, system 1000 may be a computing system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (e.g., smart watch or smart glasses), mobile internet device (MID), messaging device, data communication device, peripheral device, scanner, printer, multi-function device, and so forth.

In various implementations, system 1000 includes a platform 1002 coupled to a display 1020. Platform 1002 may receive content from a content device such as content services device(s) 1030 or content delivery device(s) 1040 or other content sources such as an image sensor 1019. For example, platform 1002 may receive raw image data from image sensor 1019 or any other content source. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016, image signal processor 1017 and/or radio 1018. Chipset 1005 may provide intercommunication among processor 1010, memory 1012, storage 1014, graphics subsystem 1015, applications 1016, image signal processor 1017 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Image signal processor 1017 may be implemented as a specialized digital signal processor or the like used for image processing. In some examples, image signal processor 1017 may be implemented based on a single instruction multiple data or multiple instruction multiple data architecture or the like. In some examples, image signal processor 1017 may be characterized as a media processor. As discussed herein, image signal processor 1017 may be implemented based on a system on a chip architecture and/or based on a multi-core architecture.

Graphics subsystem 1015 may perform processing of images such as still or video for display. Graphics subsystem 1015 may be a graphics processing unit (GPU), a visual processing unit (VPU), or an image processing unit, for example. In some examples, graphics subsystem 1015 may perform scanned image rendering as discussed herein. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or image processor and/or application specific integrated circuit may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any flat panel monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

Image sensor 1019 may include any suitable image sensor that may provide raw image data based on a scene. For example, image sensor 1019 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensor 1019 may include any device that may detect information of a scene to generate raw image data. As discussed, in some examples, system 1000 may include multiple image sensors, which may be the same or different. In some examples, image sensor 1019 may provide image capture processing or logic associated with image sensor 1019 (not shown) may provide such image capture processing. In other examples, the image capture processing discussed herein may be performed via platform 1002.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
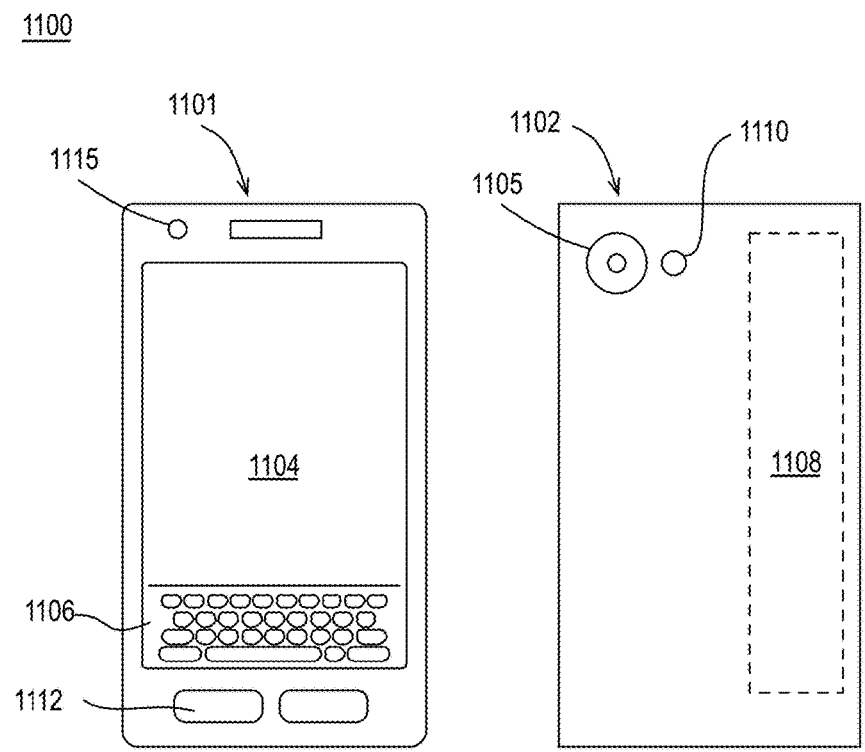
FIG. 11 illustrates an example small form factor device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, other devices or systems, or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100 and a camera 1115 integrated into front 1101 of device 1100. Camera 1105 and flash 1110 and/or camera 1115 may be components of a camera module to originate image data processed into streaming video that is output to display 1104 and/or communicated remotely from device 1100 via antenna 1108 for example. For example, camera 1105 may include image sensor 101 and camera 1115 may include image sensor 102.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for generating a dictionary for example based image processing comprises determining a plurality of candidate pairs from a training set database, wherein each of the candidate pairs comprises a predetermined look up entry and a corresponding predetermined result entry, performing example based processing for each of the look up entries of the candidate pairs using a current dictionary to determine a test result for each of the look up entries of the candidate pairs, generating, for each of the look up entries of the candidate pairs, an error result based on the test result and the predetermined result entry, and selecting at least one of the candidate pairs for inclusion in a resultant dictionary based on the error results.

Further to the first embodiments, the method further comprises iteratively determining candidate pairs, performing example based processing, generating error results, and selecting one or more pairs from the candidate pairs for inclusion in the resultant dictionary until the resultant dictionary has reached a maximum number of entries.

Further to the first embodiments, the method further comprises iteratively determining candidate pairs, performing example based processing, generating error results, and selecting one or more pairs from the candidate pairs for inclusion in the resultant dictionary until no error result in the error results is greater than a threshold for a predetermined number of iterations.

Further to the first embodiments, the method further comprises iteratively determining candidate pairs, performing example based processing, generating error results, and selecting one or more pairs from the candidate pairs for inclusion in the resultant dictionary until at least one of the resultant dictionary has reached a maximum number of entries or no error result in the error results is greater than a threshold for a predetermined number of iterations.

Further to the first embodiments, the method further comprises iteratively determining candidate pairs, performing example based processing based on a current dictionary, generating error results, and selecting one or more pairs from the candidate pairs for inclusion in the resultant dictionary, wherein the current dictionary at each iteration includes the candidate pairs for inclusion from previous iterations.

Further to the first embodiments, the candidate pairs comprise pairs of raw image pixel patches and full color pixel patches.

Further to the first embodiments, the candidate pairs comprise image pixel patches at a first resolution and image pixel patches at a resolution higher than the first resolution.

Further to the first embodiments, determining the plurality of candidate pairs comprises randomly selecting the plurality of candidate pairs from the training set database.

Further to the first embodiments, the method further comprises selecting a seed set of pairs from the training set database to provide at least a portion of the current dictionary.

Further to the first embodiments, selecting the at least one of the candidate pairs for inclusion comprises comparing the error result to a predetermined threshold.

Further to the first embodiments, the method further comprises processing a first image based on the resultant dictionary and tracking a usage rate for each entry of the resultant dictionary during the demosaicing of the first image to generate a first usage pattern, processing a second image based on the resultant dictionary and tracking a second usage rate for each entry of the resultant dictionary during the demosaicing of the second image to generate a second usage pattern, and determining a similarity scoring of the first image and the second image based on the first and second usage patterns.

In one or more second embodiments, a system for approximate nearest neighbor searching comprises a memory configured to store a training set database and a processor coupled to the memory, the processor to determine a plurality of candidate pairs from a training set database, wherein each of the candidate pairs comprises a predetermined look up entry and a corresponding predetermined result entry, to perform example based processing for each of the look up entries of the candidate pairs using a current dictionary to determine a test result for each of the look up entries of the candidate pairs, to generate, for each of the look up entries of the candidate pairs, an error result based on the test result and the predetermined result entry, and to select at least one of the candidate pairs for inclusion in a resultant dictionary based on the error results.

Further to the second embodiments, the processor is further to iteratively determine candidate pairs, perform example based processing, generate error results, and select one or more pairs from the candidate pairs for inclusion in the resultant dictionary until the resultant dictionary has reached a maximum number of entries.

Further to the second embodiments, the processor is further to iteratively determine candidate pairs, perform example based processing, generate error results, and select one or more pairs from the candidate pairs for inclusion in the resultant dictionary until no error result in the error results is greater than a threshold for a predetermined number of iterations.

Further to the second embodiments, the processor is further to iteratively determine candidate pairs, perform example based processing, generate error results, and select one or more pairs from the candidate pairs for inclusion in the resultant dictionary until at least one of the resultant dictionary has reached a maximum number of entries or until no error result in the error results is greater than a threshold for a predetermined number of iterations.

Further to the second embodiments, the processor is further to iteratively determine candidate pairs, perform example based processing based on a current dictionary, generate error results, and select one or more pairs from the candidate pairs for inclusion in the resultant dictionary, wherein the current dictionary at each iteration includes the candidate pairs for inclusion from previous iterations.

Further to the second embodiments, the candidate pairs comprise pairs of raw image pixel patches and full color pixel patches.

Further to the second embodiments, the candidate pairs comprise image pixel patches at a first resolution and image pixel patches at a resolution higher than the first resolution.

Further to the second embodiments, the candidate pairs comprise at least one of pairs of raw image pixel patches and full color pixel patches or image pixel patches at a first resolution and image pixel patches at a resolution higher than the first resolution.

Further to the second embodiments, the processor to determine the plurality of candidate pairs comprises the processor to randomly select the plurality of candidate pairs from the training set database.

Further to the second embodiments, the processor is further to select a seed set of pairs from the training set database to provide at least a portion of the current dictionary.

Further to the second embodiments, the processor to select the at least one of the candidate pairs for inclusion comprises the processor to compare the error result to a predetermined threshold.

Further to the second embodiments, the processor is further to process a first image based on the resultant dictionary and track a usage rate for each entry of the resultant dictionary during the demosaicing of the first image to generate a first usage pattern, to process a second image based on the resultant dictionary and track a second usage rate for each entry of the resultant dictionary during the demosaicing of the second image to generate a second usage pattern, and to determine a similarity scoring of the first image and the second image based on the first and second usage patterns.

In one or more third embodiments, a system comprises means for determining a plurality of candidate pairs from a training set database, wherein each of the candidate pairs comprises a predetermined look up entry and a corresponding predetermined result entry, means for performing example based processing for each of the look up entries of the candidate pairs using a current dictionary to determine a test result for each of the look up entries of the candidate pairs, means for generating, for each of the look up entries of the candidate pairs, an error result based on the test result and the predetermined result entry, and means for selecting at least one of the candidate pairs for inclusion in a resultant dictionary based on the error results.

Further to the third embodiments, the means for determining, performing, generating, and selecting comprise means for iteratively determining candidate pairs, performing example based processing, generating error results, and selecting one or more pairs from the candidate pairs for inclusion in the resultant dictionary until at least one of the resultant dictionary has reached a maximum number of entries or no error result in the error results is greater than a threshold for a predetermined number of iterations.

Further to the third embodiments, the means for determining, performing, generating, and selecting comprise means for iteratively determining candidate pairs, performing example based processing based on a current dictionary, generating error results, and selecting one or more pairs from the candidate pairs for inclusion in the resultant dictionary, wherein the current dictionary at each iteration includes the candidate pairs for inclusion from previous iterations.

Further to the third embodiments, the candidate pairs comprise pairs of raw image pixel patches and full color pixel patches.

Further to the third embodiments, the candidate pairs comprise image pixel patches at a first resolution and image pixel patches at a resolution higher than the first resolution.

Further to the third embodiments, the means for selecting the at least one of the candidate pairs for inclusion comprise means for comparing the error result to a predetermined threshold.

In one or more fourth embodiments, at least one machine readable medium comprises a plurality of instructions that, in response to being executed on a device, cause the device to generate a dictionary for example based image processing by determining a plurality of candidate pairs from a training set database, wherein each of the candidate pairs comprises a predetermined look up entry and a corresponding predetermined result entry, performing example based processing for each of the look up entries of the candidate pairs using a current dictionary to determine a test result for each of the look up entries of the candidate pairs, generating, for each of the look up entries of the candidate pairs, an error result based on the test result and the predetermined result entry, and selecting at least one of the candidate pairs for inclusion in a resultant dictionary based on the error results.

Further to the fourth embodiments, the machine readable medium further comprises a plurality of instructions that, in response to being executed on the device, cause the device to generate a dictionary for example based image processing by iteratively determining candidate pairs, performing example based processing, generating error results, and selecting one or more pairs from the candidate pairs for inclusion in the resultant dictionary until the resultant dictionary has reached a maximum number of entries or until no error result in the error results is greater than a threshold for a predetermined number of iterations.

Further to the fourth embodiments, the machine readable medium further comprises a plurality of instructions that, in response to being executed on the device, cause the device to generate a dictionary for example based image processing by iteratively determining candidate pairs, performing example based processing based on a current dictionary, generating error results, and selecting one or more pairs from the candidate pairs for inclusion in the resultant dictionary, wherein the current dictionary at each iteration includes the candidate pairs for inclusion from previous iterations.

Further to the fourth embodiments, the candidate pairs comprise at least one of pairs of raw image pixel patches and full color pixel patches or pairs comprise image pixel patches at a first resolution and image pixel patches at a resolution higher than the first resolution.

Further to the fourth embodiments, the machine readable medium further comprises a plurality of instructions that, in response to being executed on the device, cause the device to generate a dictionary for example based image processing by processing a first image based on the resultant dictionary and tracking a usage rate for each entry of the resultant dictionary during the demosaicing of the first image to generate a first usage pattern, processing a second image based on the resultant dictionary and tracking a second usage rate for each entry of the resultant dictionary during the demosaicing of the second image to generate a second usage pattern, and determining a similarity scoring of the first image and the second image based on the first and second usage patterns.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for generating a dictionary for example based image processing comprising:
   determining a plurality of candidate pairs from a training set database, wherein each of the candidate pairs comprises a predetermined look up entry and a corresponding predetermined result entry;
   performing example based processing for each of the look up entries of the candidate pairs using a current dictionary to determine a test result for each of the look up entries of the candidate pairs;
   generating, for each of the look up entries of the candidate pairs, an error result based on the test result and the predetermined result entry;
   selecting at least one of the candidate pairs for inclusion in a resultant dictionary based on the error results;
   demosaicing a first image based on the resultant dictionary and tracking a usage rate for each entry of the resultant dictionary during the demosaicing of the first image to generate a first usage pattern;
   demosaicing a second image based on the resultant dictionary and tracking a second usage rate for each entry of the resultant dictionary during the demosaicing of the second image to generate a second usage pattern; and
   determining a similarity scoring of the first image and the second image based on the first and second usage patterns.

2. The method of claim 1, further comprising:
   iteratively determining candidate pairs, performing example based processing, generating error results, and selecting one or more pairs from the candidate pairs for inclusion in the resultant dictionary until the resultant dictionary has reached a maximum number of entries.

3. The method of claim 1, further comprising:
   iteratively determining candidate pairs, performing example based processing, generating error results, and selecting one or more pairs from the candidate pairs for inclusion in the resultant dictionary until no error result in the error results is greater than a threshold for a predetermined number of iterations.

4. The method of claim 1, further comprising:
   iteratively determining candidate pairs, performing example based processing based on a current dictionary, generating error results, and selecting one or more pairs from the candidate pairs for inclusion in the resultant dictionary, wherein the current dictionary at each iteration includes the candidate pairs for inclusion from previous iterations.

5. The method of claim 1, wherein the candidate pairs comprise pairs of raw image pixel patches and full color pixel patches.

6. The method of claim 1, wherein the candidate pairs comprise image pixel patches at a first resolution and image pixel patches at a resolution higher than the first resolution.

7. The method of claim 1, wherein determining the plurality of candidate pairs comprises randomly selecting the plurality of candidate pairs from the training set database.

8. The method of claim 1, further comprising:
selecting a seed set of pairs from the training set database to provide at least a portion of the current dictionary.

9. The method of claim 1, wherein selecting the at least one of the candidate pairs for inclusion comprises comparing the error result to a predetermined threshold.

10. A system for approximate nearest neighbor searching comprising:
a memory configured to store a training set database; and
a processor coupled to the memory, the processor to determine a plurality of candidate pairs from a training set database, wherein each of the candidate pairs comprises a predetermined look up entry and a corresponding predetermined result entry, to perform example based processing for each of the look up entries of the candidate pairs using a current dictionary to determine a test result for each of the look up entries of the candidate pairs, to generate, for each of the look up entries of the candidate pairs, an error result based on the test result and the predetermined result entry, to select at least one of the candidate pairs for inclusion in a resultant dictionary based on the error results, to demosaic a first image based on the resultant dictionary and track a usage rate for each entry of the resultant dictionary during the demosaic of the first image to generate a first usage pattern, to demosaic a second image based on the resultant dictionary and track a second usage rate for each entry of the resultant dictionary during the demosaic of the second image to generate a second usage pattern, and to determine a similarity scoring of the first image and the second image based on the first and second usage patterns.

11. The system of claim 10, wherein the processor is further to iteratively determine candidate pairs, perform example based processing, generate error results, and select one or more pairs from the candidate pairs for inclusion in the resultant dictionary until at least one of the resultant dictionary has reached a maximum number of entries or until no error result in the error results is greater than a threshold for a predetermined number of iterations.

12. The system of claim 10, wherein the processor is further to iteratively determine candidate pairs, perform example based processing based on a current dictionary, generate error results, and select one or more pairs from the candidate pairs for inclusion in the resultant dictionary, wherein the current dictionary at each iteration includes the candidate pairs for inclusion from previous iterations.

13. The system of claim 10, wherein the candidate pairs comprise pairs of raw image pixel patches and full color pixel patches.

14. The system of claim 10, wherein the candidate pairs comprise image pixel patches at a first resolution and image pixel patches at a resolution higher than the first resolution.

15. The system of claim 10, wherein the processor to select the at least one of the candidate pairs for inclusion comprises the processor to compare the error result to a predetermined threshold.

16. At least one non-transitory machine readable medium comprising a plurality of instructions that, in response to being executed on a device, cause the device to generate a dictionary for example based image processing by:
determining a plurality of candidate pairs from a training set database, wherein each of the candidate pairs comprises a predetermined look up entry and a corresponding predetermined result entry;
performing example based processing for each of the look up entries of the candidate pairs using a current dictionary to determine a test result for each of the look up entries of the candidate pairs;
generating, for each of the look up entries of the candidate pairs, an error result based on the test result and the predetermined result entry; and
selecting at least one of the candidate pairs for inclusion in a resultant dictionary based on the error results;
demosaicing a first image based on the resultant dictionary and tracking a usage rate for each entry of the resultant dictionary during the demosaicing of the first image to generate a first usage pattern;
demosaicing a second image based on the resultant dictionary and tracking a second usage rate for each entry of the resultant dictionary during the demosaicing of the second image to generate a second usage pattern; and
determining a similarity scoring of the first image and the second image based on the first and second usage patterns.

17. The non-transitory machine readable medium of claim 16 further comprising a plurality of instructions that, in response to being executed on a device, cause the device to generate a dictionary for example based image processing by:
iteratively determining candidate pairs, performing example based processing, generating error results, and selecting one or more pairs from the candidate pairs for inclusion in the resultant dictionary until the resultant dictionary has reached a maximum number of entries or until no error result in the error results is greater than a threshold for a predetermined number of iterations.

18. The non-transitory machine readable medium of claim 16 further comprising a plurality of instructions that, in response to being executed on a device, cause the device to generate a dictionary for example based image processing by:
iteratively determining candidate pairs, performing example based processing based on a current dictionary, generating error results, and selecting one or more pairs from the candidate pairs for inclusion in the resultant dictionary, wherein the current dictionary at each iteration includes the candidate pairs for inclusion from previous iterations.

19. The non-transitory machine readable medium of claim 16, wherein the candidate pairs comprise at least one of pairs of raw image pixel patches and full color pixel patches or pairs comprise image pixel patches at a first resolution and image pixel patches at a resolution higher than the first resolution.

* * * * *